United States Patent
Park et al.

(10) Patent No.: US 10,763,497 B2
(45) Date of Patent: Sep. 1, 2020

(54) POSITIVE ELECTRODE ACTIVE MATERIAL FOR SECONDARY BATTERY, AND SECONDARY BATTERY COMPRISING THE SAME

(71) Applicant: LG Chem, Ltd., Seoul (KR)

(72) Inventors: Byung Chun Park, Daejeon (KR); Wang Mo Jung, Daejeon (KR); Young Cheol Choi, Daejeon (KR); Ju Kyung Shin, Daejeon (KR); Sang Min Park, Daejeon (KR); Sang Wook Lee, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 15/751,350

(22) PCT Filed: Nov. 30, 2016

(86) PCT No.: PCT/KR2016/014003
§ 371 (c)(1),
(2) Date: Feb. 8, 2018

(87) PCT Pub. No.: WO2017/095152
PCT Pub. Date: Jun. 8, 2017

(65) Prior Publication Data
US 2018/0233739 A1    Aug. 16, 2018

(30) Foreign Application Priority Data
Nov. 30, 2015   (KR) .................. 10-2015-0168676
Nov. 30, 2016   (KR) .................. 10-2016-0161895

(51) Int. Cl.
*H01M 4/36* (2006.01)
*C01G 53/00* (2006.01)
(Continued)

(52) U.S. Cl.
CPC .......... *H01M 4/366* (2013.01); *C01G 53/006* (2013.01); *C01G 53/50* (2013.01); *C01G 53/66* (2013.01);
(Continued)

(58) Field of Classification Search
CPC ...... H01M 4/366; H01M 4/505; H01M 4/525; C01G 53/006; C01G 53/50; C01G 53/70
See application file for complete search history.

(56) References Cited

U.S. PATENT DOCUMENTS 7,544,443 B2   6/2009   Fujihara et al.
9,318,739 B2   4/2016   Toya et al.
(Continued)

FOREIGN PATENT DOCUMENTS

| CN | 102714311 A | 10/2012 |
|---|---|---|
| CN | 102884659 A | 1/2013 |
| CN | 103765638 A | 4/2014 |
| CN | 104904043 A | 9/2015 |
| EP | 2557068 A1 | 2/2013 |
| EP | 2717361 A1 | 4/2014 |
| EP | 2720305 A1 | 4/2014 |
| EP | 3024070 A1 | 5/2016 |
| JP | 2007273448 A | 10/2007 |
| JP | 2009140787 A | 6/2009 |

(Continued)

OTHER PUBLICATIONS

Extended European Search Report including the Written Opinion for Application No. EP 16871048.1 dated Feb. 15, 2019.
(Continued)

*Primary Examiner* — Helen Oi K Conley
(74) *Attorney, Agent, or Firm* — Lerner, David, Littenberg, Krumholz & Mentlik, LLP

(57) ABSTRACT

The present invention provides a positive electrode active material for a secondary battery, the positive electrode active material including a lithium composite metal oxide particle represented by Formula 1 below, and a secondary battery including the same.

$$Li_aNi_{1-x-y}Co_xM1_yM2_zM3_wO_2 \quad \text{[Formula 1]}$$

In Formula 1,

M1 is a metal element whose surface energy ($\Delta E_{surf}$) calculated by Equation 1 below is −0.5 eV or higher, M2 is a metal element whose surface energy ($\Delta E_{surf}$) calculated by Equation 1 below is −1.5 eV or higher and less than −0.5 eV, M3 is a metal element whose surface energy ($\Delta E_{surf}$) calculated by Equation 1 below is less than −1.5 eV, and 1.0≤a≤1.5, 0<x≤0.5, 0<z≤0.05, 0.002≤w≤0.1, 0<x+y≤0.7.

$$\Delta E_{surf} = E_{surf2} - E_{surf1} \quad \text{[Equation 1]}$$
$$= (E_{slab2} - E_{bulk}) - (E_{slab1} - E_{bulk})$$

In Equation 1 above, $E_{surf2}$ represents an extent to which a metal element is oriented toward the outermost surface of the lithium composite metal oxide particle, $E_{surf1}$ represents an extent to which the metal element is oriented toward a central portion of the lithium composite metal oxide particle, $E_{slab1}$ is energy of a slab model of the lithium composite metal oxide particle when the metal element is at the central portion of the lithium composite metal oxide particle, $E_{slab2}$ is energy of a slab model of the lithium composite metal oxide when the metal element is at the outermost surface of the lithium composite metal oxide, and $E_{bulk}$ is energy of a bulk model corresponding to each of the slab models.

15 Claims, No Drawings

(51) Int. Cl.
    *H01M 4/525*      (2010.01)
    *H01M 4/505*      (2010.01)
    *H01M 10/0525*      (2010.01)
    *H01M 4/02*      (2006.01)

(52) U.S. Cl.
    CPC ............ *C01G 53/70* (2013.01); *H01M 4/505* (2013.01); *H01M 4/525* (2013.01); *C01P 2002/52* (2013.01); *C01P 2004/51* (2013.01); *C01P 2004/61* (2013.01); *C01P 2004/84* (2013.01); *C01P 2006/11* (2013.01); *C01P 2006/12* (2013.01); *C01P 2006/40* (2013.01); *H01M 10/0525* (2013.01); *H01M 2004/021* (2013.01); *H01M 2004/028* (2013.01)

(56) References Cited

U.S. PATENT DOCUMENTS

| | | | |
|---|---|---|---|
| 10,038,189 B2 | 7/2018 | Toya et al. |
| 10,038,190 B2 | 7/2018 | Toya et al. |
| 10,044,025 B2 | 8/2018 | Toya et al. |
| 10,128,501 B2 | 11/2018 | Fukui et al. |
| 10,236,506 B2 | 3/2019 | Toya et al. |
| 2003/0129495 A1 | 7/2003 | Yamato et al. |
| 2004/0200998 A1 | 10/2004 | Park et al. |
| 2007/0212607 A1 | 9/2007 | Fujihara et al. |
| 2013/0078520 A1 | 3/2013 | Toya et al. |
| 2013/0202966 A1 | 8/2013 | Yu et al. |
| 2013/0288129 A1 | 10/2013 | Toya et al. |
| 2014/0099545 A1 | 4/2014 | Cho et al. |
| 2014/0106228 A1 | 4/2014 | Toya et al. |
| 2014/0158932 A1 | 6/2014 | Sun et al. |
| 2014/0205901 A1 | 7/2014 | Nagai et al. |
| 2015/0228977 A1 | 8/2015 | Toya et al. |
| 2015/0357638 A1 | 12/2015 | Sun et al. |
| 2015/0364761 A1 | 12/2015 | Fukui et al. |
| 2016/0087262 A1 | 3/2016 | Toya et al. |
| 2016/0093885 A1 | 3/2016 | Kamata et al. |
| 2016/0244336 A1 | 8/2016 | Toya et al. |
| 2016/0248091 A1 | 8/2016 | Toya et al. |
| 2016/0359165 A1 | 12/2016 | Kim et al. |
| 2017/0324081 A1 | 11/2017 | Toya et al. |
| 2018/0190983 A1 | 7/2018 | Fukui et al. |
| 2018/0254481 A2 | 9/2018 | Kamata et al. |

FOREIGN PATENT DOCUMENTS

| | | |
|---|---|---|
| JP | 2013051172 A | 3/2013 |
| KR | 20020070495 A | 9/2002 |
| KR | 20030083476 A | 10/2003 |
| KR | 20060134621 A | 12/2006 |
| KR | 20060134631 A | 12/2006 |
| KR | 20110083383 A | 7/2011 |
| KR | 20140044594 A | 4/2014 |
| KR | 20140099218 A | 8/2014 |
| KR | 20150016129 A | 2/2015 |
| KR | 101555594 B1 | 10/2015 |
| WO | 2011087309 A9 | 2/2012 |
| WO | 2012164763 A1 | 12/2012 |
| WO | 2012169083 A1 | 12/2012 |
| WO | 2012169274 A1 | 12/2012 |
| WO | 2014181891 A1 | 11/2014 |

OTHER PUBLICATIONS

Search report from International Application No. PCT/KR2016/014003, dated Mar. 7, 2017.
Chinese Search Report for Application No. 201680050913.1, dated Jun. 11, 2020, pp. 1-2.

POSITIVE ELECTRODE ACTIVE MATERIAL FOR SECONDARY BATTERY, AND SECONDARY BATTERY COMPRISING THE SAME

CROSS-REFERENCE TO RELATED APPLICATION

This application is a national phase entry under 35 U.S.C. § 371 of International Application No. PCT/KR2016/014003, filed Nov. 30, 2016 which claims priority to Korean Patent Application No. 10-2015-0168676, filed on Nov. 30, 2015 and Korean Patent Application No. 10-2016-0161895, filed on Nov. 30, 2016, the disclosures of which are incorporated herein by reference.

TECHNICAL FIELD

The present invention relates to a positive electrode active material for a secondary battery having surface stability of an active material particle, stability of an internal structure, and improved interfacial stability between an electrolyte and the active material, thereby exhibiting excellent battery safety and lifespan characteristics even under high-temperature and high-voltage conditions, and a secondary battery including the same.

BACKGROUND ART

As technology development and demand for mobile devices increase, demand for secondary batteries as energy sources is sharply increasing. Among the secondary batteries, a lithium secondary battery that has high energy density and voltage, a long cycle lifespan, and a low self-discharge rate is commercialized and being widely used.

However, the lithium secondary battery has a problem in that its life sharply decreases as charge and discharge are repeated. Particularly, such a problem is more serious at high temperature. This is a phenomenon that occurs due to decomposition of an electrolyte, deterioration of an active material, and an increase in an internal resistance of a battery due to moisture in the battery or other reasons.

Accordingly, a positive electrode active material for a lithium secondary battery that is currently being vigorously researched, developed, and used is $LiCoO_2$ having a layered structure. Although $LiCoO_2$ is used the most due to its excellent lifespan characteristics and charge/discharge efficiency, there is a limitation for $LiCoO_2$ to be applied to a technology for increasing battery capacity due to its low structural stability.

As a positive electrode active material for substituting for $LiCoO_2$, various lithium transition metal oxides such as $LiNiO_2$, $LiMnO_2$, $LiMn_2O_4$, $LiFePO_4$ and $Li(Ni_{x1}Co_{y1}Mn_{z1})O_2$ have been developed. Among these, $LiNiO_2$ has an advantage of exhibiting a high discharge capacity as a battery characteristic. However, $LiNiO_2$ has problems in that synthesis is difficult with a simple solid state reaction and thermal stability and cycle characteristics are low. Also, lithium-manganese-based oxides such as $LiMnO_2$ and $LiMn_2O_4$ have advantages including excellent thermal stability and low cost. However, lithium-manganese-based oxides have problems including low capacity and low high-temperature characteristic. Particularly, $LiMn_2O_4$ is commercialized in some low-cost products but has an inferior lifespan characteristic due to structural deformation (Jahn-Teller distortion) caused by $Mn^{3+}$. Also, a large amount of research is currently being carried out on $LiFePO_4$ for use in hybrid electric vehicles (HEVs) due to low cost and excellent stability. However, it is difficult for $LiFePO_4$ to be applied to other fields due to low conductivity.

Due to such circumstances, a material that is currently being spotlighted the most as a positive electrode active material for substituting for $LiCoO_2$ is a lithium-nickel-manganese-cobalt-based oxide, $Li(Ni_{x2}Co_{y2}Mn_{z2})O_2$ (here, x2, y2, and z2 are atomic fractions of independent oxide-forming elements, and $0<x2\leq1$, $0<y2\leq1$, $0<z2\leq1$, and $0<x2+y2+z2\leq1$). This material has advantages in that the material is less expensive than $LiCoO_2$ and can be used at high capacity and high voltage. However, the lithium-nickel-manganese-cobalt-based oxide has disadvantages in that a rate capability and lifespan characteristic at high temperature are inferior.

The lithium secondary battery using the above-described positive electrode active material generally has a problem in that safety of a battery is deteriorated or a lifespan characteristic is sharply deteriorated due to an exothermic reaction accompanied by deterioration of a surface structure of the active material and sudden structural collapse as charge and discharge are repeated. Particularly, such a problem is more serious under high temperature and high voltage conditions. This is because an electrolyte is decomposed due to moisture inside a battery or other influences or the active material is deteriorated due to instability of a positive electrode surface, and interface resistance between the electrode including the active material and the electrolyte is increased.

To solve such a problem, methods of improving the structural stability and surface stability of an active material itself by doping or surface-treating the positive electrode active material and improving interfacial stability between an electrolyte and the active material have been proposed. However, the methods are not satisfactory in terms of their effects and processability.

Also, with increasing demand for high capacity batteries nowadays, there is a growing need for development of a positive electrode active material capable of improving battery safety and lifespan characteristic by securing internal structure and surface stability.

DISCLOSURE

Technical Problem

A first technical object of the present invention is to provide a positive electrode active material for a secondary battery having surface stability of an active material particle, stability of an internal structure, and improved interfacial stability between an electrolyte and the active material, thereby exhibiting excellent battery safety and lifespan characteristics even under high-temperature and high-voltage conditions.

A second technical object of the present invention is to provide a positive electrode for a secondary battery, a lithium secondary battery, a battery module, and a battery pack including the positive electrode active material.

Technical Solution

To achieve the above objects, according to an embodiment of the present invention, there is provided a positive electrode active material for a secondary battery, the positive electrode active material including a lithium composite metal oxide particle represented by Formula 1 below.

$$Li_aNi_{1-x-y}Co_xM1_yM2_zM3_wO_2 \quad \text{[Formula 1]}$$

In Formula 1, M1 is a metal element whose surface energy ($\Delta E_{surf}$) calculated by Equation 1 below is −0.5 eV or higher, M2 is a metal element whose surface energy ($\Delta_{surf}$) calculated by Equation 1 below is −1.5 eV or higher and less than −0.5 eV, M3 is a metal element whose surface energy ($\Delta_{surf}$) calculated by Equation 1 below is less than −1.5 eV, and 1.0≤a≤1.5, 0<x≤0.5, 0<y≤0.5, 0<z≤0.05, 0.002≤w≤0.1, 0<x+y≤0.7.

$$\Delta E_{surf} = E_{surf2} - E_{surf1} \quad \text{[Equation 1]}$$
$$= (E_{slab2} - E_{bulk}) - (E_{slab1} - E_{bulk})$$

In Equation 1 above, $E_{surf2}$ represents an extent to which a metal element is oriented toward the outermost surface of the lithium composite metal oxide particle, $E_{surf1}$ represents an extent to which the metal element is oriented toward a central portion of the lithium composite metal oxide particle, $E_{slab1}$ is energy of a slab model of the lithium composite metal oxide particle when the metal element is at the central portion of the lithium composite metal oxide particle, $E_{slab2}$ is energy of a slab model of the lithium composite metal oxide particle when the metal element is at a surface of the lithium composite metal oxide particle, and $E_{bulk}$ is energy of a bulk model corresponding to each of the slab models.

According to another embodiment of the present invention, there are provided a positive electrode for a secondary battery, a lithium secondary battery, a battery module, and a battery pack including the positive electrode active material.

Other details of the embodiments of the present invention are included in the detailed description below.

Advantageous Effects

According to the present invention, a positive electrode active material for a secondary battery has excellent particle surface stability and internal structure stability and improved interfacial stability between an electrolyte and the active material. Because a secondary battery according to the present invention includes the positive electrode active material having the above-described characteristics, excellent battery safety and lifespan characteristics can be exhibited even under high-temperature and high-voltage conditions.

BEST MODE

Hereinafter, the present invention will be described in more detail to assist understanding of the present invention.

Terms or words used in the present specification and claims are not to be limitedly interpreted as general or dictionary meanings and should be interpreted as meanings and concepts that are consistent with the technical idea of the present invention on the basis of the principle that an inventor may properly define concepts of terms to describe his or her invention in the best way.

According to an embodiment of the present invention, a positive electrode active material for a secondary particle includes a lithium composite metal oxide particle represented by Formula 1 below.

[Formula 1]

In Formula 1, M1 is a metal element whose surface energy ($\Delta E_{surf}$) calculated by Equation 1 below is −0.5 eV or higher, M2 is a metal element whose surface energy ($\Delta_{surf}$) calculated by Equation 1 below is −1.5 eV or higher and less than −0.5 eV, M3 is a metal element whose surface energy ($\Delta_{surf}$) calculated by Equation 1 below is less than −1.5 eV, and 1.0≤a≤1.5, 0<x≤0.5, 0<y≤0.5, 0<z≤0.05, 0.002≤w≤0.1, 0<x+y≤0.7.

$$\Delta E_{surf} = E_{surf2} - E_{surf1} \quad \text{[Equation 1]}$$
$$= (E_{slab2} - E_{bulk}) - (E_{slab1} - E_{bulk})$$

In Equation 1 above, $E_{surf2}$ represents an extent to which a metal element is oriented toward the outermost surface of the lithium composite metal oxide particle, $E_{surf1}$ represents an extent to which the metal element is oriented toward a central portion of the lithium composite metal oxide particle, $E_{slab1}$ is energy of a slab model of the lithium composite metal oxide particle when the metal element is at the central portion of the lithium composite metal oxide particle, $E_{slab2}$ is energy of a slab model of the lithium composite metal oxide particle when the metal element is at the outermost surface of the lithium composite metal oxide particle, and $E_{bulk}$ is energy of a bulk model corresponding to each of the slab models.

In the present invention, when fabricating the positive electrode active material for a secondary battery, by examining a position preference on a positive electrode active material particle in accordance with an amount of surface energy of an element, and allowing the corresponding element to exhibit an optimized concentration profile from a surface of the positive electrode active material particle to a central section thereof, the positive electrode active material is allowed to have improved surface stability of the active material particle and stability of an internal structure and improved interfacial stability between an electrolyte and the active material. As a result, a secondary battery, which is the final product, can exhibit excellent battery safety and lifespan characteristic even under high-temperature and high-voltage conditions.

In the positive electrode active material according to an embodiment of the present invention, the lithium composite metal oxide may include a compound of Formula 1 below.

[Formula 1]

In Formula 1, M1 is a metal element whose surface energy ($\Delta_{surf}$) calculated by Equation 1 below is −0.5 eV or higher, M2 is a metal element whose surface energy ($\Delta_{surf}$) calculated by Equation 1 below is −1.5 eV or higher and less than −0.5 eV, M3 is a metal element whose surface energy ($\Delta_{surf}$) calculated by Equation 1 below is less than −1.5 eV, and 1.0≤a≤1.5, 0<x≤0.5, 0<y≤0.5, 0<z≤0.05, 0.002≤w≤0.1, 0<x+y≤0.7.

In the present invention, the surface energy ($E_{surf}$) calculated by Equation 1 below may represent an extent to which a metal element is oriented toward the outermost surface or the central portion of the lithium composite metal oxide particle.

$$\Delta E_{surf} = E_{surf2} - E_{surf1} \quad \text{[Equation 1]}$$
$$= (E_{slab2} - E_{bulk}) - (E_{slab1} - E_{bulk})$$

In Equation 1 above, $E_{surf2}$ represents an extent to which a metal element is oriented toward the outermost surface of the lithium composite metal oxide particle, and $E_{surf1}$ represents an extent to which the metal element is oriented toward a central portion, that is, the center, of the lithium composite metal oxide particle. $E_{surf1}$ and $E_{surf2}$ represent a difference between values of energy of a slab model and energy of a bulk model when the metal element is located at the central portion and the outermost surface of the lithium composite metal oxide particle. $E_{slab1}$ is energy of a slab model of the lithium composite metal oxide particle when the metal element is at the central portion of the lithium composite metal oxide particle. $E_{slab2}$ is energy of a slab model of the lithium composite metal oxide particle when the metal element is at the outermost surface of the lithium composite metal oxide particle. $E_{bulk}$ is energy of a bulk model corresponding to each of the slab models and is stoichiometrically calculated regardless of a position of the metal element in the lithium composite metal oxide.

As the surface energy value ($\Delta_{surf}$) calculated by Equation 1 above exhibits a larger positive value, it indicates that a metal element has a property of tending to be located at the central portion of the lithium composite metal oxide particle. Conversely, as the surface energy value exhibits a lower negative value, it indicates that a metal element has a property of tending to be located at the surface of the lithium composite metal oxide particle. Consequently, the metal element whose surface energy exhibits a positive value diffuses to the central portion of the lithium composite metal oxide particle. Also, the metal element whose surface energy exhibits a negative value infiltrates into the surface of the lithium composite metal oxide particle. As the surface energy value is closer to 0, it signifies that a metal element does not exhibit an orientation toward the surface or the central portion. That is, as the surface energy value is closer to 0, a metal element may be evenly distributed at a constant concentration throughout the lithium composite metal oxide particle. In the present invention, a surface energy value of a metal element may be determined through modeling calculation by a positive electrode discrete fourier transform (DFT) method.

In the present invention, a concentration profile refers to a graph showing a content of a metal element within a depth from a surface of the lithium composite metal oxide particle to a central portion thereof when the x-axis indicates the depth from the particle surface to the central portion and the y-axis indicates the content of the metal element. For example, a positive average slope of a concentration profile signifies that a relatively larger amount of a corresponding metal element is located at a central portion section of the lithium composite metal oxide particle than at a surface portion of the particle, and a negative average slope thereof signifies that a relatively larger amount of a metal element is located at the surface portion of the lithium composite metal oxide particle than at the central portion section thereof. According to the present invention, a concentration profile may be checked using methods such as x-ray photoelectron spectroscopy (XPS) (also referred to as electron spectroscopy for chemical analysis (ESCA), an electron probe micro analyzer (EPMA), an inductively coupled plasma-atomic emission spectrometer (ICP-AES), or time-of-flight secondary ion mass spectrometry (ToF-SIMS). Specifically, when a profile of a metal element in the lithium composite metal oxide is checked using the XPS, an atomic ratio of a metal may be measured for each etching time while etching the active material in a direction from a surface of the lithium composite metal oxide particle toward a central portion thereof, and a concentration profile of the metal element may be confirmed from this.

Specifically, in the positive electrode active material according to an embodiment of the present invention, the M1, which is the metal element whose surface energy ($E_{surf}$) is −0.5 eV or higher, may be included to have a single concentration value, that is, the same concentration at which the slope of the concentration profile is 0, throughout the lithium composite metal oxide particle or may be included such that the concentration profile has a positive (+) average slope from the surface of the lithium composite metal oxide particle to the central portion section thereof. More specifically, the M1 may have surface energy of −0.5 to 0.5 eV. Accordingly, the M1 may have almost no orientation toward the surface or center of the particle and be included in a uniform content throughout the lithium composite metal oxide particle, thereby exhibiting superior internal structure stability of the lithium composite metal oxide particle.

Specifically, M1 that satisfies the above surface energy condition may include any one or two or more selected from the group consisting of Al, Mg, Y, Zn, In, and Mn. The M1 may improve crystal stability of the active material and improve lifespan and high-temperature characteristics of a battery.

In the lithium composite metal oxide of Formula 1, the M1 may be included at a content corresponding to y, that is, a content of $0<y\leq0.5$. When y is 0, an improvement effect in accordance with including M1 is unable to be obtained, and when y exceeds 0.5, there is a concern that an output characteristic and a capacity characteristic of a battery may rather be deteriorated. In consideration of the remarkableness of the effect of improving a battery characteristic in accordance with including the element M1, M1 may be included at a content of, more specifically, $0.1<y\leq0.2$.

In the positive electrode active material, M2, which is the metal element whose surface energy is −1.5 eV or higher and less than −0.5 eV, more specifically, −1.5 eV to −1.0 eV, may be distributed such that an average slope of a concentration profile is negative (−) from a surface of the positive electrode active material particle toward a central portion thereof. M2 whose surface energy satisfies the above conditions has an orientation toward the surface. However, M2 has a lower orientation toward the surface and a higher orientation toward the center in comparison to the M3, and an absolute value of an average slope of a concentration profile of M2 may be smaller in comparison to the M3.

In a crystal structure of the lithium composite metal oxide, M2 that satisfies the above surface energy conditions may substitute for some of Ni, Co, or M1 and be present at a position at which Ni, Co, or M1 should be present. Alternatively, M2 may be doped into the lithium composite metal oxide. The M2 may also react with lithium present at a surface of the lithium composite metal oxide and form a lithium oxide. More specifically, M2 that satisfies the above surface energy conditions may include any one or two or more selected from the group consisting of Zr, Ti, Ta, Hf, Sn, Cr, Sb, Ru, Gd, and Os, and more specifically, may be Ti or Zr.

In the lithium composite metal oxide particle of Formula 1, the M2 may be included at a content corresponding to z, that is, a content of $0<z\leq0.05$. When the content of M2 is 0 or exceeds 0.05, it may not be easy to realize stabilities of a surface and an internal structure of the lithium composite metal oxide. As a result, the effect of improving output and lifespan characteristics may be insignificant. In consideration of surface stability of the lithium composite metal oxide particle in accordance with control of a content of the M2 and the remarkableness of the effect of improving a battery characteristic as a result thereof, M2 may be included at a content of, more specifically, $0<z\leq0.02$.

In the positive electrode active material, M3, which is the metal element whose surface energy is less than −1.5 eV, more specifically, −1.8 eV to −4.0 eV, has a high orientation toward the surface. Thus, the M3 is present at a high concentration at the surface side of the lithium composite metal oxide particle, thereby improving surface stability of the lithium composite metal oxide.

Specifically, M3 that satisfies the above surface energy conditions is an element corresponding to Group 6 (group VIB) of the periodic table and may be introduced to the surface side of the lithium composite metal oxide particle when fabricating the lithium composite metal oxide particle and rearrange the crystal structure. Accordingly, M3 may simultaneously allow the lithium composite metal oxide to have a more stable crystal structure and suppress a particle growth during a sintering process. In a crystal structure of the lithium composite metal oxide particle, M3 may substitute for some of Ni, Co, or M1 and be present at a position at which Ni, Co, or M1 should be present or may react with lithium present at the particle surface and form a lithium oxide. Accordingly, the crystal grain size may be controlled by adjusting a content and an input timing of M3. More specifically, M3 may be any one or two or more elements selected from the group consisting of W, V, Nb, Nd, and Mo, and more specifically, may be at least one element of W and Nb. Among these, M3 may be excellent in terms of improving an output characteristic when M3 is W and in terms of high-temperature durability when M3 is Nb.

In the lithium composite metal oxide particle of Formula 1, M3 may be included at a content corresponding to w, that is, a content of $0.002 \leq w \leq 0.1$. When the content of M3 is less than 0.002 or exceeds 0.1, it may not be easy to realize surface stability of the lithium composite metal oxide particle, and as a result, the effect of improving output and lifespan characteristics may be insignificant. In consideration of surface stability of the lithium composite metal oxide particle in accordance with control of a content of the M3 and the remarkableness of the effect of improving a battery characteristic as a result thereof, M3 may be included at a content of, more specifically, $0.005 \leq w \leq 0.5$.

In the lithium composite metal oxide particle of Formula 1, Li may be included at a content corresponding to a, that is, $1.0 \leq a \leq 1.5$. When a is less than 1.0, there is a concern that the capacity may be deteriorated, and when a exceeds 1.5, the particle is sintered in a sintering process and it may be difficult to fabricate an active material. In consideration of balance between the remarkableness of the effect of improving a capacity characteristic of a positive electrode active material in accordance with control of Li content and sinterability when fabricating the active material, Li may be included at a content of, more specifically, $1.0 \leq a \leq 1.15$.

In the lithium composite metal oxide of Formula 1, Ni may be included at a content corresponding to 1−x−y, that is, a content of $0.3 \leq 1-x-y \leq 1$. When 1−x−y is less than 0.3, there is a concern that the capacity characteristic may be deteriorated, and when 1−x−y exceeds 1, there is a concern that high-temperature stability may be deteriorated. In consideration of the remarkableness of the effect of improving the capacity characteristic in accordance with including Ni, Ni may be included at a content of, more specifically, $0.35 < 1-x-y \leq 0.8$.

Also, in the lithium composite metal oxide of Formula 1 above, Co may be included at a content corresponding to x, that is, a content of $0 < x \leq 0.5$. When x is 0, there is a concern that the capacity characteristic may be deteriorated, and when x exceeds 0.5, there is a concern that cost may be increased. In consideration of the remarkableness of the effect of improving the capacity characteristic in accordance with including Co, Co may be included at a content of, more specifically, $0.1 \leq x < 0.35$.

The lithium composite metal oxide particle according to an embodiment of the present invention may have a core-shell structure including a core and a shell formed on a surface of the core.

Specifically, in the lithium composite metal oxide particle according to an embodiment of the present invention, the core refers to a region that is present inside the lithium composite metal oxide particle and is close to the center of the particle except the surface of the particle. Also, the core may be a region that is present inside the lithium composite metal oxide particle and is capable of maintaining a regular crystal structure. Specifically, the core may be a region corresponding to a distance from the center of the particle to the surface thereof ($r_{in}$), that is a distance 0% to less than 100%, more specifically, 0% to 70% of a radius of the particle from the center of the particle. According to the present invention, "shell" refers to a region close to the surface except the center of the particle or the inside of the particle. The shell may be a region in which the regular crystal structure is not maintained due to a geometric limitation thereof. Specifically, the shell may be a region corresponding to a distance from the surface of the particle to the center thereof ($r_{sur}$), that is a distance 0% to less than 100%, more specifically, 0% to 30% of the radius of the particle from the surface of the particle.

More specifically, the lithium composite metal oxide particle having the core-shell structure may include the core and the shell in a volume ratio of 50:50 to 80:20. When the volume ratio of the core and the shell exceeds the above range, the effect of improving active material stability in accordance with position control of a metal element may be insignificant.

In the present invention, the core and the shell may be differentiated using an X-diffraction analysis result of the lithium composite metal oxide particle.

More specifically, in the lithium composite metal oxide particle having the core-shell structure, the M1, which is the metal element whose surface energy ($\Delta E_{surf}$) is −0.5 eV or higher, more specifically, −0.5 eV to 0.5 eV, may be included at a single concentration throughout the lithium composite metal oxide particle.

Also, the M2, which is the metal element whose surface energy is −1.5 eV or higher and less than −0.5 eV, more specifically, −1.5 eV to 1.0 eV, may be included at a concentration of 1 to 25 mol % in the core and at a concentration of 75 to 99 mol % in the shell. The metal element whose surface energy satisfies the above conditions has an orientation toward the particle surface or a lower orientation toward the surface and a higher orientation toward the center in comparison to the M3. When the M2 is included in the lithium composite metal oxide particle with the above content conditions, surface stability and internal structure stability of the lithium composite metal oxide particle may be exhibited.

The M3, which is the metal element whose surface energy is less than −1.5 eV, more specifically, −1.5 eV to −4.0 eV, may be include at a concentration of 1 to 10 mol % in the core and at 90 to 99 mol % in the shell. The M3 whose surface energy satisfies the above conditions has a high orientation toward the particle surface, and when the M3 is included in the lithium composite metal oxide particle with the above content conditions, excellent surface stability of the lithium composite metal oxide particle may be exhibited.

In the positive electrode active material according to an embodiment of the present invention, at least one metal element of nickel and cobalt included in the lithium composite metal oxide of Formula 1 may exhibit a concentration gradient that increases or decreases in the positive electrode active material particle.

Specifically, in the positive electrode active material according to an embodiment of the present invention, at least one metal element of nickel and cobalt may have a concentration gradient in which the metal concentration continuously changes throughout the active material particle, and a slope of the concentration gradient of the metal element may exhibit one or more values. By having a continuous concentration gradient in this way, because a sharp phase boundary region is not present from the center to the surface, a crystal structure is stabilized, and thermal stability is increased. When the slope of the concentration gradient of a metal is constant, the effect of improving structural stability may be further improved. Also, by varying a concentration of each of the metals within the active material particle by a concentration gradient, characteristics of a corresponding metal can be easily utilized, and thus the effect of the positive electrode active material improving battery performance can be further improved.

In present invention, "a concentration of a metal exhibits a continuously-changing concentration gradient" means that a concentration of a metal is present at a gradually changing concentration distribution throughout the particle. Specifically, in the concentration distribution, a change in metal concentration per 1 μm, more specifically, 0.1 μm in a particle may be a concentration gradient, that is, a concentration difference, of 0.1 atom % to 30 atom %, more specifically, 0.1 atom % to 20 atom %, and even more specifically, 1 atom % to 10 atom %, based on a total atomic weight of a corresponding metal included in the lithium composite metal oxide.

More specifically, in the lithium composite metal oxide, a concentration of nickel included in the lithium composite metal oxide may decrease with a continuous concentration gradient in a direction from a center of the lithium composite metal oxide particle toward a surface of the particle. Here, a slope of the concentration gradient of nickel may be constant from the center of the lithium composite metal oxide particle toward the surface. In this way, when the concentration of nickel remains high at the particle center in the lithium composite metal oxide particle and the concentration of nickel includes a concentration gradient that gradually decreases toward the surface of the particle, thermal stability of the lithium composite metal oxide may be improved.

In the lithium composite metal oxide, a concentration of cobalt included in the lithium composite metal oxide may increase with a continuous concentration gradient in a direction from the center of the lithium composite metal oxide particle toward the surface of the particle. Here, a slope of the concentration gradient of the lithium composite metal oxide may be constant from the center of the lithium composite metal oxide particle toward the surface. In this way, when the concentration of cobalt remains low at the center of the particle in the lithium composite metal oxide particle and the concentration of cobalt has a concentration gradient that gradually increases toward the surface of the particle, capacity and output characteristics of the positive electrode active material may be improved while reducing a use amount of cobalt.

In the lithium composite metal oxide, nickel and cobalt may independently exhibit a concentration gradient that changes throughout the lithium composite metal oxide particle. The concentration of nickel may decrease with a continuous concentration gradient in the direction from the center of the lithium composite metal oxide particle toward the surface thereof. The concentration of cobalt may independently increase with a continuous concentration gradient in the direction from the center of the lithium composite metal oxide particle toward the surface thereof. In this way, by including a combined concentration gradient, in which the concentration of nickel decreases and the concentration of cobalt increases toward the surface of the lithium composite metal oxide particle throughout the lithium composite metal oxide, thermal stability may be improved while a capacity characteristic of the lithium composite metal oxide is maintained.

The lithium composite metal oxide according to an embodiment of the present invention may include at least one metal element selected from the group consisting of the M2 and M3; or a coating layer including a lithium oxide formed due to a reaction between the at least one metal element and lithium on a surface of the lithium composite metal oxide particle due to diffusion toward the surface of the lithium composite metal oxide particle in accordance with surface orientations of the M2 and M3 in a fabrication process thereof.

When the lithium composite metal oxide further includes a coating layer including M2 or M3 diffused toward the surface, the lithium composite metal oxide may include a lithium composite metal oxide having a composition represented by Formula 2 below:

$$Li_aNi_{1-x-y}Co_xM1_yM2_zM3_wO2.M2'_{z'}M3'_{w'}$$ [Formula 2]

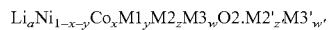

In Formula 2, M1, M2, M3, a, x, y, z, and w are the same as those defined above, M2' and M3' are respectively M2 and M3 located on the surface of the lithium composite metal oxide, w' and z' are respectively coating amounts of M3' and M2', w' is 0.01 to 10 atom % based on the total amount of M3, and z' is 5 to 30 atom % based on the total amount of M2.

When the coating amount is too small, an improvement effect due to coating may be insignificant, and when the coating amount is too large, there is a concern that structural stability may be relatively deteriorated due to a decrease in the amount distributed inside the lithium composite metal oxide particle. According to the present invention, coating of the metal element refers to the metal element being physically absorbed into or chemically coupled to the surface of the lithium composite metal oxide.

When the coating layer includes a lithium oxide formed due to a reaction between the metal element M2 or M3 and lithium, specifically, the lithium oxide may include a compound of Formula 3 below:

$$Li_m(M2_pM3_{1-p})O_{(m+n)/2}$$ [Formula 3]

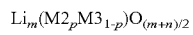

In Formula 3, M2 is any one or two or more elements selected from the group consisting of Zr, Ti, Ta, Hf, Sn, Cr, Sb, Ru, Gd, and Os, M3 is any one or two or more elements selected from the group consisting of W, V, Nb, Nd, and Mo, $2 \leq m \leq 10$, n is a sum of oxidation numbers of M2 and M3, and $0 \leq p \leq 1$.

The positive electrode active material according to an embodiment of the present invention having the above structure may have an average particle size ($D_{50}$) of 4 μm to 20 μm. When the average particle size of the positive electrode active material is less than 4 μm, there is a concern that structural stability of the positive electrode active material particle may be deteriorated, and when the average particle size of the positive electrode active material exceeds 20 μm, there is a concern that an output characteristic of a secondary battery may be deteriorated. In consideration of the remarkableness of an improvement effect in accordance with simultaneous control of a concentration distribution of a metal element in the positive electrode active material particle and an average particle size of the active material, the average particle size of the positive electrode active material may be 5 μm to 18 μm. In the present invention, the average particle size ($D_{50}$) of the positive electrode active material may be defined as a particle size based on a particle size distribution at 50%. According to the present invention, the average particle size ($D_{50}$) of the positive electrode active material particle may be measured using, for example, electron microscopy observation using scanning electron microscopy (SEM), field emission scanning electron microscopy (FE-SEM), or the like or using a laser diffraction method. More specifically, when the average particle size ($D_{50}$) is measured using the laser diffraction method, the positive electrode active material particles may be dispersed in a dispersion medium, the dispersed particles may be introduced into a commercially available laser diffraction particle size measurement device (for example, Microtrac MT 3000), and then an ultrasonic wave of about 28 kHz may be radiated with an output of 60 W to calculate the average particle size ($D_{50}$) based on a particle size distribution at 50% in the measurement device.

The positive electrode active material according to an embodiment of the present invention may have a Brunauer-Emmett-Teller (BET) specific surface area of 0.3 $m^2$/g to 1.9 $m^2$/g.

When the BET specific surface area exceeds 1.9 $m^2$/g, there are concerns about the deterioration of dispersibility of positive electrode active materials in the active material layer due to condensation between the positive electrode active materials and an increase of resistance in an electrode. When the BET specific surface area is less than 0.3 $m^2$/g, there are concerns about the deterioration of dispersibility of the positive electrode active material itself and deterioration of capacity. In the present invention, the specific surface area of the positive electrode active material is measured using a BET method. Specifically, the specific surface area may be calculated from a nitrogen gas absorption amount under a liquid nitrogen temperature (77K) using BELSORP-mini II of BEL Japan company.

The positive electrode active material according to an embodiment of the present invention simultaneously satisfies the conditions of the average particle size and the BET specific surface area, thereby exhibiting excellent capacity and charge/discharge characteristics. More specifically, the positive electrode active material may have an average particle size ($D_{50}$) of 4 μm to 15 μm and a BET specific surface area of 0.5 $m^2$/g to 1.5 $m^2$/g. According to the present invention, the specific surface area of the positive electrode active material is measured using the BET method. Specifically, the specific surface area may be calculated from a nitrogen gas absorption amount at a liquid nitrogen temperature (77K) using BELSORP-mini II of BEL Japan Company.

The positive electrode active material according to an embodiment of the present invention may have a tap density equal to or higher than 1.7 g/cc or 1.7 g/cc to 2.8 g/cc. By having a high tap density in the above range, a high capacity characteristic can be exhibited. According to the present invention, the tap density of the positive electrode active material may be measured using a general tap density measuring device, and specifically, may be measured using Tap-tester of SEISHIN Enterprise Co. Ltd.

The positive electrode active material according to an embodiment of the present invention having the above structure and physical properties may be fabricated by a wet precipitation method and, specifically, may be fabricated with a coprecipitation method in accordance with a method of forming a precursor.

Specifically, a method of fabricating the positive electrode active material using the coprecipitation method includes a step of preparing a precursor by adding an ammonium cation-containing complexing agent and a basic compound to a metal-containing solution, which is produced by mixing a nickel raw material, a cobalt raw material, and an M1 raw material (here, M1 is a metal element whose surface energy ($E_{surf}$) is −0.5 eV or higher, specifically, at least one element selected from the group consisting of Al, Mg, Y, Zn, In, and Mn), and performing a reaction (Step 1), and a step of mixing the precursor with a lithium raw material and then sintering at 700° C. to 1,200° C. (Step 2). Here, an M2 raw material and an M3 raw material (here, M2 is a metal element whose surface energy is −1.5 eV or higher and less than −0.5 eV, specifically, any one or two or more elements selected from the group consisting of Zr, Ti, Ta, Hf, Sn, Cr, Sb, Ru, Gd, and Os, and M3 is a metal element whose surface energy is less than −1.5 eV, specifically, any one or two or more elements selected from the group consisting of W, V, Nb, Nd, and Mo) may be further added when fabricating the metal-containing solution or mixing the precursor with the lithium raw material.

The metal-containing solution may be produced by dissolving the nickel raw material, the cobalt raw material, the M1-containing raw material, and selectively, the M2 or M3-containing raw material to a solvent, specifically, water or a mixture of water and an organic solvent (specifically, an alcohol or the like) that may be uniformly mixed with water. Alternatively, solutions, specifically, aqueous solutions, including each of the metal raw materials may be produced, and then the solutions may be mixed to produce the metal-containing solution. Here, a mixing ratio of the raw materials may be properly determined within the range that allows the conditions of contents of the metal elements in the finally fabricated positive electrode active material to be satisfied.

An acetate, a nitrate, a sulfate, a halide, a sulfide, an oxide, a hydroxide, an oxyhydroxide, or the like may be used as the metal element-containing raw material, and the metal elements-containing raw material is not particularly limited as long as the metal element-containing raw material can be dissolved in water.

For example, examples of the cobalt raw material may include $Co(OH)_2$, CoOOH, $Co(SO_4)_2$, $Co(OCOCH_3)_2 \cdot 4H_2O$, $Co(NO_3)_2 \cdot 6H_2O$, $CoCl_2$, $Co(SO_4)_2 \cdot 7H_2O$, or the like, and any one of the above or a mixture of two or more of the above may be used as the cobalt raw material.

Examples of the nickel raw material may include $Ni(OH)_2$, NiO, NiOOH, $NiCO_3 \cdot 2Ni(OH)_2 \cdot 4H_2O$, $NiC_2O_2 \cdot 2H_2O$, $NiCl_2$, $Ni(NO_3)_2 \cdot 6H_2O$, $NiSO_4$, $NiSO_4 \cdot 6H_2O$, fatty acid nickel salts, nickel halides, or the like, and any one of the above or a mixture of two or more of the above may be used as the nickel raw material.

Examples of the manganese raw material may include manganese oxides such as $Mn_2O_3$, $MnO_2$, and $Mn_3O_4$; manganese salts such as $MnCO_3$, $MnCl_2$, $Mn(NO_3)_2$, $MnSO_4$, manganese acetate, manganese dicarboxylate, manganese citrate, and fatty acid manganese salts; an oxyhydroxide, manganese chloride, and the like, and any one of the above or a mixture of two or more of the above may be used as the manganese raw material.

Examples of an aluminum raw material may include $AlSO_4$, $AlCl_3$, Al-isopropoxide, $AlNO_3$, or the like, and any one of the above or a mixture of two or more of the above may be used as the aluminum raw material.

An acetate, a nitrate, a sulfate, a halide, a sulfide, a hydroxide, an oxide, an oxyhydroxide, or the like including the M2 may be used as the M2 raw material. For example, when M2 is Ti, titanium oxide may be used.

An acetate, a nitrate, a sulfate, a halide, a sulfide, a hydroxide, an oxide, an oxyhydroxide, or the like including the M3 may be used as the M3 raw material. For example, when M3 is W, tungsten oxide may be used.

The ammonium cation-containing complexing agent may be, specifically, $NH_4OH$, $(NH_4)_2SO_4$, $NH_4NO_3$, $NH_4Cl$, $CH_3COONH_4$, $NH_4CO_3$, or the like, and any one of the above of a mixture of two or more of the above may be used as the ammonium cation-containing complexing agent. Further, the ammonium cation-containing complexing agent may also be used in the form of an aqueous solution, and here, water or a mixture of water and an organic solvent (specifically, an alcohol or the like) that may be uniformly mixed with water may be used as a solvent.

The ammonium cation-containing complexing agent may be added in an amount such that the molar ratio is 0.5 to 1 with respect to 1 mole of the metal-containing solution. Generally, a chelating agent reacts with a metal at a molar ratio of 1:1 or higher to form a complex. However, because an unreacted complex in the formed complex that has not reacted with the basic aqueous solution may be converted into an intermediate product and be recovered as a chelating agent for reuse, the use amount of chelating agent may be lowered in the present invention in comparison to the general case. As a result, the crystallinity of the positive electrode active material may be improved, and the positive electrode active material may be stabilized.

The basic compound may be a hydroxide of an alkali metal or an alkaline earth metal such as NaOH, KOH, $Ca(OH)_2$, or the like or a hydrate thereof, and any one of the above or a mixture of two or more of the above may be used as the basic compound. The basic compound may also be used in the form of an aqueous solution, and here, water or a mixture of water and an organic solvent (specifically, an alcohol or the like) that may be uniformly mixed with water may be used as a solvent.

The coprecipitation reaction for forming the precursor may be performed under a condition in which pH is 11 to 13. When the pH deviates from the above range, there is a concern that the size of the fabricated precursor may be changed or particle fragmentation may be caused. Also, there is a concern that metal ions may be eluted at a surface of the precursor and form various oxides by side reaction. More specifically, the coprecipitation reaction may be performed under a condition in which the pH is 11 to 12.

The ammonium cation-containing complexing agent and the basic compound may be used in a molar ratio of 1:10 to 1:2 to satisfy the above-mentioned pH range. Here, the pH value refers to a pH value of a liquid at a temperature of 25° C.

The coprecipitation reaction may be performed at a temperature of 40° C. to 70° C. under an inert atmosphere of nitrogen or the like. Further, a stirring process may be selectively performed to increase a reaction speed during the reaction, and here, the stirring speed may be 100 rpm to 2,000 rpm.

When a concentration gradient of a metal element in the finally fabricated positive electrode active material is attempted to be formed, a second metal-containing solution including nickel, cobalt, and M1-containing raw materials and, selectively, M2 and M3-containing raw materials in different concentrations from the above metal-containing solution may be prepared, then, simultaneously, the second metal-containing solution may be added to the transition metal solution such that a mixing ratio of the metal-containing solution and the second-metal containing solution is gradually changed from 100 vol %:0 vol % to 0 vol %:100 vol %, and the ammonium cation-containing complexing agent and the basic compound may be added thereto, and a reaction may be performed, thereby forming the concentration gradient.

In this way, by continuously increasing an amount of the second metal-containing solution being input into the metal-containing solution and controlling a reaction speed and reaction time, a precursor that exhibits a concentration gradient in which concentrations of nickel, cobalt, and M1 independently continuously change from the center of the particle toward a surface thereof may be fabricated with a single coprecipitation reaction process. In this case, the concentration gradient of a metal in the resulting precursor and a slope of the concentration gradient may be easily adjusted by compositions and mixing supply ratios of the metal-containing solution and the second metal-containing solution. Extending a reaction time and decreasing a reaction speed are preferable to reach a high density state in which a concentration of a specific metal is high, and shortening a reaction time and increasing a reaction speed are preferable to reach a low density state in which a concentration of a specific metal is low.

Specifically, the second metal-containing solution may be added to the metal-containing solution such that a speed of adding the second metal-containing solution is continuously increased within the range of 1 to 30% of an initial input speed. Specifically, an input speed of the metal-containing solution may be 150 ml/hr to 210 ml/hr, and an input speed of the second metal-containing solution may be 120 ml/hr to 180 ml/hr. The input speed of the second metal-containing solution may be continuously increased within the range of 1% to 30% of the initial input speed within the input speed range. Here, the reaction may be performed at 40° C. to 70° C. Also, a size of a precursor particle may be adjusted by adjusting a supply amount and reaction time of the second metal-containing solution with respect to the metal-containing solution.

By the above process, a particle of a composite metal hydroxide is generated and precipitated in a reaction solution as a precursor. Specifically, the precursor may include a compound of Formula 4 below.

$$Ni_{1-x-y}Co_xM1_yM2_zM3_w(OH_{1-a})_2 \qquad \text{[Formula 4]}$$

(In Formula 4, M1, M2, M3, x, y, z, and w are the same as those defined above, and $0 \le a \le 0.5$)

The precipitated precursor may be separated in accordance with a general method, and then a drying process may be selectively performed.

The drying process may be performed in accordance with a general drying method and, specifically, may be performed for 15 to 30 hours using a method such as heat treatment and hot air injection in the temperature range of 100° C. to 200° C.

In the fabrication method for fabricating the positive electrode active material, Step 2 is a step of fabricating the positive electrode active material by mixing the precursor particle fabricated in Step 1 with the lithium-containing raw material and selectively with the M2 and M3 raw materials and then sintering. Here, the M2 and M3 raw materials are the same as those described above.

Examples of the lithium-containing raw material may include a lithium-containing carbonate (for example, lithium carbonate or the like), a hydrate (for example, lithium hydroxide I hydrate ($LiOH \cdot H_2O$) or the like), a hydroxide (for example, lithium hydroxide or the like), a nitrate (for example, lithium nitrate ($LiNO_3$) or the like), and a chloride (for example, lithium chloride (LiCl) or the like), and any one of the above or a mixture of two or more of the above may be used as the lithium-containing raw material. A use amount of the lithium-containing raw material may be determined in accordance with contents of lithium and a transition metal in the finally fabricated lithium composite metal oxide, and specifically, lithium included in the lithium raw material and a metal element (Me) included in the precursor may be used in amounts such that the molar ratio (molar ratio of lithium/metal element (Me)) is 1.0 or higher.

The sintering process may be performed at 700° C. to 1,200° C.

When a sintering temperature is less than 700° C., there is a concern about a decrease in sinterability, and when a sintering temperature exceeds 1,200° C., there is a concern about the generation of side reactants caused by excessive sintering. More specifically, the sintering process may be performed at 800° C. to 1,000° C.

The sintering process may be performed in an air atmosphere or an oxygen atmosphere (for example, $O_2$ or the like), and more specifically, may be performed under an oxygen atmosphere at an oxygen partial pressure of 20 vol % or higher. The sintering process may be performed for 5 hours to 48 hours or for 10 hours to 20 hours under the above conditions.

A sintering aid may be selectively further added during the sintering process.

When the sintering aid is added, crystals may be easily grown at low temperature, and non-uniform reaction may be minimized during dry mixing. Also, the sintering aid has an effect of dulling an edge portion of a primary particle of the lithium composite metal oxide and forming the primary particle into a particle having a round curved shape. Generally, elution of manganese frequently occurs from an edge of a particle in the lithium oxide-based positive electrode active material including manganese, and due to the elution of manganese, a characteristic, particularly, a lifespan characteristic at high temperature, of a secondary battery is decreased. With respect to this, when the sintering aid is used, a portion from which manganese is eluted may be reduced by rounding the edge of the primary particle, and as a result, stability and lifespan characteristics of a secondary battery may be improved.

Specifically, examples of the sintering aid may include boron compounds such as boric acid, lithium tetraborate, boron oxide, and ammonium borate; cobalt compounds such as cobalt oxide (II), cobalt oxide (III), cobalt oxide (IV), and tricobalt tetraoxide; vanadium compounds such as vanadium oxide; lanthanum compounds such as lanthanum oxide; zirconium compounds such as zirconium boride, calcium silicate zirconium, and zirconium oxide; yttrium compounds such as yttrium oxide; gallium compounds such as gallium oxide, or the like. Any one of the above or a mixture of two or more of the above may be used as the sintering aid.

The sintering aid may be used in an amount of 0.2 parts by weight to 2 parts by weight, more specifically, 0.4 parts by weight to 1.4 parts by weight, with respect to 100 parts by weight of the precursor.

A moisture-removing agent may be selectively further added during the sintering process. Specifically, examples of the moisture-removing agent may include citric acid, tartaric acid, glycolic acid, maleic acid, or the like, and any one of the above or a mixture of two or more of the above may be used as the moisture-removing agent. The moisture-removing agent may be used in an amount of 0.01 to 2 parts by weight with respect to 100 parts by weight of the precursor.

The positive electrode active material fabricated by the above process may have excellent particle surface stability and internal structure stability and improved interfacial stability between an electrolyte and the positive electrode active material, thereby exhibiting excellent battery safety and lifespan characteristics even under high-temperature and high-voltage conditions. Also, the distribution of transition metals in the positive electrode active material may be further controlled, and as a result, thermal stability may be improved, and performance deterioration at high voltage may be minimized.

Accordingly, according to still another embodiment of the present invention, a positive electrode and a lithium secondary battery including the above-described positive electrode active material are provided.

Specifically, the positive electrode includes a positive electrode current collector and a positive electrode active material layer formed on the positive electrode current collector and including the above-described positive electrode active material.

The positive electrode current collector is not particularly limited as long as the positive electrode current collector does not cause a chemical change to a battery and has conductivity, and for example, stainless steel, aluminum, nickel, titanium, calcined carbon, or an aluminum or stainless steel whose surface is treated with carbon, nickel, titanium, silver, or the like may be used as the positive electrode current collector. Generally, the positive electrode current collector may have a thickness of 3 to 500 μm, and an adhesive force of a positive electrode active material may be improved by forming fine irregularities on a surface of the current collector. For example, the positive electrode current collector may be used in various forms such as a film, a sheet, a foil, a net, a porous body, a foam body, and a nonwoven fabric body.

In addition to the above-described positive electrode active material, the positive electrode active material layer may include a conductive material and a binder.

Here, the conductive material is used to impart conductivity to an electrode, and in a constituted battery, any conductive material can be used without particular limitations as long as the conductive material does not cause a chemical change and has electronic conductivity. Specific examples include graphite such as natural graphite or artificial graphite; a carbon-based material such as carbon black, acetylene black, Ketjen black, channel black, furnace black, lamp black, summer black, and carbon fiber; metal powder or metal fiber such as copper, nickel, aluminum, and silver; conductive whisker such as zinc oxide and potassium titanate; a conductive metal oxide such as titanium oxide; a conductive polymer such as a polyphenylene derivative, or the like, and any one or a mixture of two or more selected therefrom may be used as the conductive material. Generally, the conductive material may be included at 1 to 30 wt % with respect to a total weight of the positive electrode active material layer.

The binder performs a role of improving adhesion between positive electrode active material particles and an adhesive force between the positive electrode active material and the current collector. Specific examples thereof include polyvinylidene fluoride (PVDF), a PVDF-hexafluoropropylene copolymer (PVDF-co-HFP), polyvinyl alcohol, polyacrylonitrile, carboxymethyl cellulose (CMC), starch, hydroxypropylcellulose, regenerated cellulose, polyvinyl pyrrolidone, tetrafluoroethylene, polyethylene, polypropylene, an ethylene-propylene-diene monomer (EPDM), a sulfonated EPDM, styrene butadiene rubber (SBR), fluororubber, or various copolymers thereof, and one or a mixture of two or more selected therefrom may be used as the binder. The binder may be included at 1 to 30 wt % with respect to the total weight of the positive electrode active material layer.

Except for use of the above-described positive electrode active material, the positive electrode may be fabricated in accordance with a general method of fabricating a positive electrode. Specifically, the positive electrode may be fabricated by applying a composition for forming a positive electrode active material layer that includes the above-described positive electrode active material and selectively includes the binder and the conductive material on the positive electrode current collector and then drying and rolling. Here, the types and contents of the positive electrode active material, the binder, and the conductive material are the same as those described above.

A solvent may be a solvent that is generally used in the art, examples of the solvent may include dimethyl sulfoxide (DMSO), isopropyl alcohol, N-methyl pyrrolidone (NMP), acetone, or water, and one or a mixture of two or more selected therefrom may be used as the solvent. A use amount of the solvent is sufficient as long as the solvent has a viscosity capable of allowing the positive electrode active material, the conductive material, and the binder to be dissolved or dispersed and exhibiting excellent thickness uniformity when applied layer for fabricating a positive electrode in consideration of a thickness of an applied slurry and a fabrication yield.

With another method, the positive electrode may be fabricated by casting the composition for forming the positive electrode active material layer on a separate support body and then laminating a film obtained by separation from the support body on the positive electrode current collector.

According to still another embodiment of the present invention, an electrochemical device including the positive electrode is provided. Specifically, the electrochemical device may be a battery, a capacitor, and the like, and more specifically, may be a lithium secondary battery.

Here, an operating voltage of the lithium secondary battery may be 2.5V to 4.6V. This is because the lithium secondary battery can be operated at a relatively high voltage as safety of the battery is improved due to structural stability of the positive electrode active material including the composite metal oxide with excess lithium of Formula 1. More specifically, the lithium secondary battery according to an embodiment of the present invention may be a battery operated at a high voltage of 3.1 V to 4.6 V, and more specifically, a battery operated at a high voltage of 3.4 V to 4.6 V or 3.5 V to 4.35 V.

Specifically, the lithium secondary battery includes a positive electrode, a negative electrode disposed opposite the positive electrode, a separator interposed between the positive electrode and the negative electrode, and an electrolyte, and the positive electrode is the same as that described above. Also, the lithium secondary battery may selectively further include a battery container configured to store an electrode assembly including the positive electrode, the negative electrode, and the separator, and a sealing member configured to seal the battery container.

In the lithium secondary battery, the negative electrode includes a negative electrode current collector and a negative electrode active material layer disposed on the negative electrode current collector.

The negative electrode current collector is not particularly limited as long as the negative electrode current collector does not cause a chemical change to a battery and has high conductivity, and for example, copper, stainless steel, aluminum, nickel, titanium, calcined carbon, or a copper or stainless steel whose surface is treated with carbon, nickel, titanium, silver, and the like, an aluminum-cadmium alloy etc. may be used as the negative electrode current collector. Generally, the negative electrode current collector may have a thickness of 3 μm to 500 μm, and, like the positive electrode current collector, an adhesive force of a negative electrode active material may be improved by forming fine irregularities on a surface of the current collector. For example, the negative electrode current collector may be used in various forms such as a film, a sheet, a foil, a net, a porous body, a foam body, and a nonwoven fabric body.

In addition to the above-described negative electrode active material, the negative electrode active material layer may selectively include a conductive material and a binder. As an example, the negative electrode active material layer may be fabricated by applying a composition for forming a negative electrode that includes the negative electrode active material and selectively includes the binder and the conductive material on the negative electrode current collector and then drying, or by casting the composition for forming the negative electrode on a separate support body and then laminating a film obtained by separation from the support body on the negative electrode current collector.

A compound capable of reversible intercalation and deintercalation of lithium may be used as the negative electrode active material. Specific examples include a carbonaceous material such as artificial graphite, natural graphite, graphitized carbon fiber, and amorphous carbon; a metallic compound capable of being formed into an alloy with lithium, such as Si, Al, Sn, Pb, Zn, Bi, In, Mg, Ga, Cd, an Si-alloy, an Sn-alloy, and an Al-alloy; a metal oxide capable of doping and dedoping lithium, such as $SiO_x$ ($0<x<2$), $SnO_2$, vanadium oxide, and lithium vanadium oxide; or a composite including the metallic compound and the carbonaceous material, such as an Si—C compound or an Sn—C compound, and one or a mixture of two or more selected therefrom may be used as the negative electrode active material. Also, a metal lithium thin film may be used as the negative electrode active material. Both low crystalline carbon and high crystalline carbon may be used as the carbon material. Soft carbon and hard carbon are typical low crystalline carbon, and high-temperature calcined carbons such as amorphous, plate-shaped, flake-shaped, spherical, or fiber type natural graphite or artificial graphite, Kish graphite, pyrolytic carbon, mesophase pitch based carbon fiber, meso-carbon microbeads, mesophase pitches, and petroleum or coal tar pitch derived cokes are typical high crystalline carbon.

Also, the binder and the conductive material may be the same as those described above with respect to the positive electrode.

In the lithium secondary battery, the separator separates the negative electrode and the positive electrode and provides a movement path for lithium ions, and anything that is generally used as a separator in a lithium secondary battery may be used without particular limitation. Particularly, it is preferable that the separator have low resistance with respect to ion movement in an electrolyte and have excellent ability of impregnating an electrolyte. Specifically, a porous polymer film, for example, a porous polymer film fabricated with a polyolefin-based polymer such as an ethylene homopolymer, a propylene homopolymer, an ethylene-butene copolymer, an ethylene-hexene copolymer, and an ethylene-methacrylate copolymer or a stacked structure of two or more layers thereof may be used. Also, a general porous nonwoven fabric, for example, a nonwoven fabric formed of high-melting-point glass fiber, polyethylene terephthalate fiber, or the like may be used. A coated separator including a ceramic component or a polymer material for securing heat resistance or mechanical strength may be used, and may be used in a single-layer or multi-layer structure.

Examples of an electrolyte used in the present invention may include an organic liquid electrolyte, an inorganic liquid electrolyte, a solid polymer electrolyte, a gel-type polymer electrolyte, an inorganic solid electrolyte, and a molten-type inorganic electrolyte, which can be used in the manufacture of a lithium secondary battery, but the present invention is not limited thereto.

Specifically, the electrolyte may include an organic solvent and a lithium salt.

Anything that can serve as a medium capable of moving ions that are involved in an electrochemical reaction of a battery can be used as the organic solvent without particular limitation. Specifically, an ester-based solvent such as methyl acetate, ethyl acetate, γ-butyrolactone, and ε-caprolactone; an ether-based solvent such as dibutyl ether or tetrahydrofuran; a ketone-based solvent such as cyclohexanone; an aromatic hydrocarbon-based solvent such as benzene and fluorobenzene; a carbonate-based solvent such as dimethylcarbonate (DMC), diethylcarbonate (DEC), methylethylcarbonate (MEC), ethylmethylcarbonate (EMC), ethylene carbonate (EC), and propylene carbonate (PC); an alcohol-based solvent such as ethyl alcohol and isopropyl alcohol; nitriles such as R—CN (R is a linear, branched, or cyclic hydrocarbon group of C2 to C20, and may include a double bond aromatic ring or an ether bond); amides such as dimethylformamide; dioxolanes such as 1.3-dioxolane; or sulfolane may be used as the organic solvent. Among these, the carbonate-based solvent is preferable, and a mixture of a cyclic carbonate (for example, EC or PC) having high ion conductivity and a high dielectric constant capable of improving the charge/discharge performance of a battery and a linear carbonate-based compound (for example, EMC, DMC, or DEC) having a low viscosity is more preferable. In this case, excellent performance of an electrolyte may be exhibited when the cyclic carbonate and the chain carbonate are mixed in a volume ratio of about 1:1 to 1:9 and used.

Any compound capable of providing lithium ions used in a lithium secondary battery may be used as the lithium salt without particular limitation. Specifically, $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, LiCl, LiI, $LiB(C_2O_4)_2$, or the like may be used as the lithium salt. The concentration of the lithium salt is preferably in the range of 0.1 M to 2.0 M. When the concentration of the lithium salt is within the above range, because the electrolyte has an appropriate conductivity and viscosity, the electrolyte can exhibit excellent electrolyte performance, and the lithium ions can effectively move.

For purposes of improving a lifespan characteristic of a battery, suppressing a decrease in battery capacity, improving a discharge capacity of a battery, and the like, for example, the electrolyte may further include one or more additives such as haloalkylene carbonate-based compound such as difluoroethylene carbonate or the like, pyridine, triethyl phosphite, triethanolamine, cyclic ether, ethylenediamine, n-glyme, hexaphosphate triamide, a nitrobenzene derivative, sulfur, quinone imine dyes, N-substituted oxazolidinone, N,N-substituted imidazolidine, ethylene glycol dialkyl ether, ammonium salt, pyrrole, 2-methoxyethanol, aluminum trichloride, or the like in addition to the components of the electrolyte. Here, the additive may be included at 0.1 wt % to 5 wt % with respect to the total weight of the electrolyte.

Due to excellent stability of the positive electrode active material, the lithium secondary battery including the positive electrode active material according to the present invention may exhibit excellent battery safety and lifespan characteristic even under high-temperature and high-voltage conditions. Accordingly, the lithium secondary battery is useful for portable devices such as a mobile phone, a laptop computer, and a digital camera and in the electric vehicle field including a hybrid electric vehicle (HEV).

Accordingly, according to another implementation of the present invention, a battery module including the lithium secondary battery as a unit cell and a battery pack including the same are provided.

The battery module or battery pack may be used as a power source of a medium to large sized device of one or more of a power tool; an electric car including an electric vehicle (EV), a hybrid electric vehicle, and a plug-in hybrid electric vehicle (PHEV); or a power storage system.

MODE

Hereinafter, an embodiment of the present invention will be described in detail so that one of ordinary skill in the art to which the present invention pertains can easily practice the present invention. However, the present invention may be implemented in various other forms and is not limited to the embodiment described herein.

Reference Example 1-1: Fabrication of Positive Electrode Active Material

A 3 L wet reactor tank was filled with 2 L of distilled water, and then nitrogen gas was introduced into the tank at a speed of 1 L/min to remove dissolved oxygen. Here, the temperature of the distilled water in the tank was maintained at 45° C. using a temperature maintaining device. Also, the distilled water in the tank was stirred at a speed of 1,200 rpm using an impeller connected to a motor installed outside the tank.

Nickel sulfate, manganese sulfate, and cobalt sulfate were mixed in a molar ratio of 0.6:0.2:0.2 in water to prepare a metal-containing solution at a concentration of 1.5 M, and a 3 M-aqueous sodium hydroxide solution was separately prepared. The metal-containing solution was continuously pumped by a volumetric pump into the wet reactor tank at 0.18 L/hr. The aqueous sodium hydroxide solution was variably pumped so that the distilled water in the wet reactor tank was maintained at a pH of 11.5 by linkage with a control device to adjust the pH of the distilled water in the tank. Here, a 30% aqueous ammonia solution was continuously pumped into the reactor at a speed of 0.035 L/hr.

Flow rates of the metal-containing solution, the aqueous sodium hydroxide solution, and the aqueous ammonia solution were adjusted so that the average residence time of the solutions in the wet reactor tank was 6 hours. After the reaction in the tank reached a steady state, a nickel-cobalt-manganese composite metal precursor, which was fabricated by metal ions of the metal-containing solution, hydroxide ions of sodium hydroxide, and ammonia ions of the aqueous ammonia solution continuously reacting for 20 hours, was continuously obtained through an overflow pipe installed at the top beside the tank. The obtained composite metal precursor was washed with distilled water and dried for 24 hours in a constant-temperature drier at 120° C.

Then, 0.0998 moles of the composite metal precursor were dry-mixed with 0.002 moles of $Al_2O_3$ and 1 mole of $Li_2CO_3$, and the mixture was sintered for 10 hours at 900° C. to fabricate a positive electrode active material, (Li$(Ni_{0.6}Mn_{0.2}Co_{0.2})_{0.998}Al_{0.002}O_2$).

Reference Examples 1-2 to 1-21: Fabrication of Positive Electrode Active Material The positive electrode active material was fabricated by the same method as in Reference Example 1-1 above except for doping with Mn, Mg, Y, Zn, In, Ti, Hf, Sn, Cr, Zr, Sb, Ta, Ru, Gd, Os, V, Nb, W, Mo, or Nd instead of an Al dopant in Reference Example 1-1 above.

Experiment Example 1

To predict a positional orientation of a metal element in a positive electrode active material, a surface energy value ($E_{surf}$) and a preferred position of a dopant with respect to the positive electrode active material fabricated in Reference Examples 1-1 to 1-21 were predicted by modeling calculation using the DFT method. A result of the analysis is shown in Table 1 below.

$$\Delta E_{surf} = E_{surf2} - E_{surf1} \quad [\text{Equation 1}]$$
$$= (E_{slab2} - E_{bulk}) - (E_{slab1} - E_{bulk})$$

(In Equation 1 above, $E_{surf1}$, $E_{surf2}$, $E_{slab1}$, $E_{slab2}$, and $E_{bulk}$ are the same as those defined above)

TABLE 1

| Type | Dopant type | $\Delta E_{surf}$ |
|---|---|---|
| Reference Example 1-1 | Al | 0.720 |
| Reference Example 1-2 | Mn | 0.420 |
| Reference Example 1-3 | Mg | 0.384 |
| Reference Example 1-4 | Y | 0.223 |
| Reference Example 1-5 | Zn | −0.052 |
| Reference Example 1-6 | In | −0.164 |
| Reference Example 1-7 | Ti | −0.633 |
| Reference Example 1-8 | Hf | −0.673 |
| Reference Example 1-9 | Sn | −0.906 |
| Reference Example 1-10 | Cr | −0.913 |
| Reference Example 1-11 | Zr | −1.074 |
| Reference Example 1-12 | Sb | −1.083 |
| Reference Example 1-13 | Ta | −1.137 |
| Reference Example 1-14 | Ru | −1.155 |
| Reference Example 1-15 | Gd | −1.171 |
| Reference Example 1-16 | Os | −1.497 |
| Reference Example 1-17 | V | −1.505 |
| Reference Example 1-18 | Nb | −1.531 |
| Reference Example 1-19 | W | −2.072 |
| Reference Example 1-20 | Mo | −2.273 |
| Reference Example 1-21 | Nd | −2.566 |

When surface energy of a metal element in the positive electrode active material exhibits a positive value based on 0, it indicates that the metal element has a property of tending to infiltrate into a central portion of the positive electrode active material particle. When the surface energy exhibits a negative value, it indicates that the metal element has a property of tending to diffuse toward a surface of the positive electrode active material particle.

As a result of calculating surface energy values ($\Delta E_{surf}$) by Equation 1 above from surface energy variations of the metal elements of Table 1, Al, Mn, Mg, Y, Zn, and In have a surface energy value of −0.5 eV or higher, and particularly, Mg, Y, Zn, and In exhibited a surface energy value of −0.5 to 0.5 eV, which is close to 0. From this, it can be confirmed that Mg, Y, Zn, and In do not exhibit an orientation toward the center or the surface of the particle, and it can be predicted that an average slope of a concentration profile in the positive electrode active material is 0 or has a positive value close to 0. Also, it can be confirmed that Ru, Gd, Os, V, Nb, W, Mo, and Nd have a negative surface energy value, specifically a surface energy value less than −1.5 eV, and exhibit an orientation toward the surface of the positive electrode active material particle, and it can be confirmed that Ti, Hf, Sn, Cr, Zr, Sb, and Ta exhibit a surface energy value equal to or higher than −1.5 eV and less than −0.5 eV and exhibit a lower orientation toward the surface than Ru, Gd, Os, V, Nb, W, Mo, and Nd.

Example 1-1: Fabrication of Positive Electrode Active Material

A 3 L wet reactor tank was filled with 2 L of distilled water, and then nitrogen gas was introduced into the tank at a speed of 1 L/min to remove dissolved oxygen. Here, the temperature of the distilled water in the tank was maintained at 45° C. using a temperature maintaining device. Also, the distilled water in the tank was stirred at a speed of 1,200 rpm using an impeller connected to a motor installed outside the tank.

Nickel sulfate, manganese sulfate, and cobalt sulfate were mixed in a molar ratio of 0.6:0.2:0.2 in water to prepare a metal-containing solution at a concentration of 1.5 M, and a 4M-aqueous NaOH solution was separately prepared. The metal-containing solution was continuously pumped by a volumetric pump into the wet reactor tank at 0.18 L/hr. The aqueous sodium hydroxide solution was variably pumped so that the distilled water in the wet reactor tank was maintained at a pH of 11.5 by linkage with a control device to adjust the pH of the distilled water in the tank. Here, a 30% aqueous ammonia solution was continuously pumped into the reactor at a speed of 0.035 L/hr.

Flow rates of the metal-containing solution, the aqueous sodium hydroxide solution, and the aqueous ammonia solution were adjusted so that the average residence time of the solutions in the wet reactor tank was 6 hours. After the reaction in the tank reached a steady state, a nickel-cobalt-manganese composite metal precursor, which was fabricated by metal ions of the metal-containing solution, hydroxide ions of sodium hydroxide, and ammonia ions of the aqueous ammonia solution continuously reacting for 20 hours, was continuously obtained through an overflow pipe installed at the top beside the tank. The obtained precursor was washed with distilled water and dried for 24 hours in a constant-temperature drier at 120° C.

Then, 0.935 moles of the precursor were dry-mixed with 1.05 mole, 0.005 mole, and 0.01 mole of $Li_2CO_3$, tungsten oxide ($WO_3$) and titanium oxide ($TiO_2$), respectively, and the mixture was sintered for 10 hours at 850° C. under an oxygen atmosphere (oxygen partial pressure of 20 vol %) to fabricate a positive electrode active material, ($Li_{1.05}(Ni_{0.6}Mn_{0.2}Co_{0.2})_{0.935}W_{0.005}Ti_{0.01}O_2$).

Example 1-2: Fabrication of Positive Electrode Active Material

The positive electrode active material, $Li_{1.05}(Ni_{0.6}Mn_{0.2}Co_{0.2})_{0.935}W_{0.005}Zr_{0.01}O_2$ was fabricated by the same method as in Example 1-1 above except that zirconium oxide ($ZrO_2$) was used instead of titanium oxide ($TiO_2$) at the same content as $TiO_2$ in Example 1-1 above.

Example 1-3: Fabrication of Positive Electrode Active Material

The positive electrode active material, $Li_{1.05}(Ni_{0.6}Mn_{0.2}Co_{0.2})_{0.935}Nb_{0.005}Ti_{0.01}O_2$ was fabricated by the same method as in Example 1-1 above except that niobium oxide ($Nb_2O_5$) was used instead of tungsten oxide ($WO_3$) in the same content as $WO_3$ in Example 1-1 above.

Example 1-4: Fabrication of Positive Electrode Active Material

The positive electrode active material, $Li_{1.05}(Ni_{0.6}Al_{0.2}Co_{0.2})_{0.935}W_{0.005}Ti_{0.01}O_2$ was fabricated by the same method as in Example 1-1 above except that aluminum sulfate was used instead of manganese sulfate at the same content as manganese sulfate in Example 1-1 above.

Comparative Example 1-1: Fabrication of Positive Electrode Active Material

A 3 L wet reactor tank was filled with 2 L of distilled water, and then nitrogen gas was introduced into the tank at a speed of 1 L/min to remove dissolved oxygen. Here, the temperature of the distilled water in the tank was maintained at 45° C. using a temperature maintaining device. Also, the distilled water in the tank was stirred at a speed of 1,200 rpm using an impeller connected to a motor installed outside the tank.

Nickel sulfate, manganese sulfate, and cobalt sulfate were mixed in a molar ratio of 0.6:0.2:0.2 in water to prepare a metal-containing solution at a concentration of 1.5 M, and a 4 M-aqueous NaOH solution was separately prepared. The metal-containing solution was continuously pumped by a volumetric pump into the wet reactor tank at 0.18 L/hr. The aqueous sodium hydroxide solution was variably pumped so that the distilled water in the wet reactor tank was maintained at a pH of 11.5 by linkage with a control device to adjust the pH of the distilled water in the tank. Here, a 30% aqueous ammonia solution was continuously pumped into the reactor at a speed of 0.035 L/hr.

Flow rates of the metal-containing solution, the aqueous sodium hydroxide solution, and the aqueous ammonia solution were adjusted so that the average residence time of the solutions in the wet reactor tank was 6 hours. After the reaction in the tank reached a steady state, a nickel-cobalt-manganese composite metal precursor, which was fabricated by metal ions of the metal-containing solution, hydroxide ions of sodium hydroxide, and ammonia ions of the aqueous ammonia solution continuously reacting for 20 hours, was continuously obtained through an overflow pipe installed at the top beside the tank. The obtained precursor was washed with distilled water and dried for 24 hours in a constant-temperature drier at 120° C.

Then, 1 mole of the precursor was dry-mixed with 1.05 moles of $Li_2CO_3$, the mixture was sintered for 10 hours at 850° C. under an oxygen atmosphere (oxygen partial pressure of 20 vol %) to fabricate a positive electrode active material, ($Li_a(Ni_{0.6}Co_{0.2}Mn_{0.2})O_2$).

Comparative Example 1-2: Fabrication of Positive Electrode Active Material

The positive electrode active material, $Li_{1.05}(Ni_{0.6}Mn_{0.2}Co_{0.2})_{0.935}W_{0.005}MO_{0.01}O_2$ was fabricated by the same method as in Example 1-1 above except that molybdenum oxide ($MoO_3$) was used instead of titanium oxide at the same content as titanium oxide in Example 1-1 above.

Comparative Example 1-3: Fabrication of Positive Electrode Active Material

The positive electrode active material of Reference Example 1-1 was used.

Comparative Example 1-4: Fabrication of Positive Electrode Active Material

The positive electrode active material of Reference Example 1-7 was used.

Example 2-1 to Example 2-4 and Comparative Example 2-1 to Comparative Example 2-4: Fabrication of Lithium Secondary Battery A lithium secondary battery was fabricated using each of the positive electrode active materials fabricated in Example 1-1 to Example 1-4 above and Comparative Example 1-1 to Comparative Example 1-4.

Specifically, each of the positive electrode active materials fabricated in Example 1-1 to Example 1-4 above and Comparative Example 1-1 to Comparative Example 1-4, carbon black which is a conductive material, and PVDF which is a binder were mixed in a weight ratio of 95:2.5:2.5 in an N-methyl pyrrolidone (NMP) solvent to fabricate a composition for forming a positive electrode (viscosity: 5,000 mPa·s), and the composition was applied on an aluminum current collector, dried at 130° C., and rolled to fabricate a positive electrode.

Also, natural graphite as a negative electrode active material, carbon black as a conductive material, and PVDF as a binder were mixed in a weight ratio of 85:10:5 in an NMP solvent to fabricate a composition for forming a negative electrode, and the composition was applied on a copper current collector to fabricate a negative electrode.

A porous polyethylene separator was interposed between the positive electrode and the negative electrode fabricated as above to fabricate an electrode assembly, the electrode assembly was placed inside a case, and then an electrolyte was injected into the case to fabricate a lithium secondary battery. Here, the electrolyte was fabricated by dissolving lithium hexafluorophosphate (LiPF$_6$) at a concentration of 1.0 M in an organic solvent consisting of EC/DMC/EMC in a mixing volume ratio of 3:4:3.

Experiment Example 2

To confirm a distribution of metal elements included in a lithium composite metal oxide with respect to positive electrode active material particles according to Example 1-1 and Comparative Example 1-2 above, the active material was subjected to etching using HCl for various times, elution amounts of the elements according to etching time or dissolution time were analyzed through inductively coupled plasma (ICP) analysis, and from a result thereof, a composition of the lithium composite metal oxide in the active material particle was confirmed. A result thereof is shown in Table 2 and Table 3.

TABLE 2

| Dissolution time (minutes) | Type | Distance from particle surface (μm) | Example 1-1(molar ratio) | | | | |
|---|---|---|---|---|---|---|---|
| | | | Ni | Co | Mn | Ti | W |
| 0 | Shell | 0 | 0.561 | 0.215 | 0.209 | 0.010 | 0.005 |
| 1 | portion | 0.1 | 0.575 | 0.208 | 0.205 | 0.008 | 0.004 |
| 5 | | 0.3 | 0.593 | 0.201 | 0.197 | 0.006 | 0.003 |
| 10 | | 0.8 | 0.595 | 0.200 | 0.199 | 0.005 | 0.001 |
| 30 | Core | 1.1 | 0.599 | 0.200 | 0.199 | 0.002 | 0 |
| 120 | portion | 3.6 | 0.600 | 0.200 | 0.200 | 0 | 0 |
| 240 | | 4.9 (particle center) | 0.600 | 0.200 | 0.200 | 0 | 0 |

TABLE 3

| Dissolution time (minutes) | Type | Distance from particle surface (μm) | Comparative Example 1-2(molar ratio) | | | | |
|---|---|---|---|---|---|---|---|
| | | | Ni | Co | Mn | Mo | W |
| 0 | Cell | 0 | 0.560 | 0.218 | 0.207 | 0.010 | 0.005 |
| 1 | portion | 0.1 | 0.575 | 0.212 | 0.201 | 0.008 | 0.004 |
| 5 | | 0.3 | 0.592 | 0.202 | 0.197 | 0.006 | 0.003 |
| 10 | | 0.8 | 0.597 | 0.201 | 0.196 | 0.005 | 0.001 |
| 30 | Core | 1.0 | 0.600 | 0.200 | 0.198 | 0.002 | 0 |
| 120 | portion | 3.5 | 0.600 | 0.200 | 0.200 | 0 | 0 |
| 240 | | 4.8 (particle center) | 0.601 | 0.200 | 0.199 | 0 | 0 |

Experiment Example 4: Evaluation of Positive Electrode Active Material

An average particle size, a specific surface area, and a tap density of each of the positive electrode active materials fabricated in Example 1-1 to Example 1-4 and Comparative Example 1-1 to Comparative Example 1-4 were measured, and a result thereof is shown in Table 4.

(1) Average particle size ($D_{50}$): The positive electrode active material particle was introduced into a laser diffraction particle size measurement device (for example, Microtrac MT 3000), and then an ultrasonic wave of about 28 kHz was radiated with an output of 60 W to calculate the average particle size ($D_{50}$) based on a particle size distribution at 50% in the measurement device.

(2) BET specific surface area: the specific surface area of the positive electrode active material was measured using the BET method, and specifically, the specific surface area was calculated from a nitrogen gas absorption amount at a liquid nitrogen temperature (77K) using BELSORP-mini II of BEL Japan Company.

(3) Tap density: the tap density was measured under a pressure of 2 tonf/cm$^2$ using a tap density measuring device (HPRM-A1, Han Tech Company Ltd.).

A coin cell (using Li metal as a negative electrode) fabricated using each of the positive electrode active materials fabricated in Example 1-1 to Example 1-4 above and Comparative Example 1-1 to Comparative Example 1-4 was charged until a constant current (CC) of 0.1 C until 4.25V at 25° C., and then charging at a constant voltage (CV) of 4.25V was performed, thereby performing one-time charging until a charging current reached 0.05 mAh. Then, the coin cell was left for 20 minutes and then discharged until 3.0V at the constant current of 0.1 C to measure a first-cycle discharge capacity. Then, each of charge/discharge capacity, charge/discharge efficiency, and rate capability was evaluated after changing a discharge condition to 2 C. A result thereof is shown in Table 4 below.

TABLE 4

| Type | Average particle size ($D_{50}$) (μm) | BET specific surface area ($m^2/g$) | Tap density (g/cc) | First charge/discharge | | | 2 C rate | |
|---|---|---|---|---|---|---|---|---|
| | | | | Charge capacity (mAh/g) | Discharge capacity (mAh/g) | Charge/discharge efficiency (%) | Capacity (mAh/g) | 2.0 C/0.1 C (%) |
| Example 1-1 | 9.8 | 0.35 | 2.4 | 196.5 | 181.4 | 92.3 | 165.8 | 91.4 |
| Example 1-2 | 9.6 | 0.41 | 2.3 | 195.4 | 179.2 | 91.7 | 164.3 | 91.7 |
| Example 1-3 | 9.8 | 0.38 | 2.4 | 194.2 | 179.4 | 92.4 | 165.2 | 92.1 |
| Example 1-4 | 10.2 | 0.31 | 2.4 | 197.6 | 180.8 | 91.5 | 165.6 | 91.6 |
| Comparative Example 1-1 | 10.4 | 0.43 | 2.4 | 196.5 | 177.6 | 90.4 | 161.3 | 90.8 |
| Comparative Example 1-2 | 9.6 | 0.44 | 2.4 | 195.5 | 177.1 | 90.6 | 159.6 | 90.1 |
| Comparative Example 1-3 | 9.8 | 0.51 | 2.3 | 197.1 | 175.6 | 89.1 | 155.8 | 88.7 |
| Comparative Example 1-4 | 9.9 | 0.47 | 2.2 | 195.3 | 176.2 | 90.2 | 157.2 | 89.2 |

As a result of the experiments, it was confirmed that a coin cell including the positive electrode active material of Example 1-1 to Example 1-4 exhibits superior charge/discharge efficiency and rate capability and an improved effect in terms of capacity characteristic in comparison to a coin cell including the positive electrode active material of Comparative Example 1-1 to Comparative Example 1-4.

Experiment Example 5: Evaluation of Battery Characteristics of Lithium Secondary Battery Battery characteristics of lithium secondary batteries (Examples 2-1 to 2-3, Comparative Examples 2-1 to 2-4) respectively including the positive electrode active materials of Example 1-1 to Example 1-3 and Comparative Example 1-1 to Comparative Example 1-4 were evaluated using a method below.

Specifically, charge/discharge was performed 300 times under a 1 C/2 C condition within a driving voltage range of 2.8 V to 4.15 V at a temperature of 25° C. with respect to the lithium secondary battery.

Also, to evaluate an output characteristic, a battery charged/discharged at room temperature (25° C.) was charged on the basis of a SOC 50%, and resistance was measured. A range in which a voltage was dropped when a current was applied on the basis of the SOC 50% was measured at high temperature (60° C.).

As a result thereof, resistance at room temperature (25° C.) and high temperature (60° C.), a cycle capacity retention rate (%), which is a ratio of a discharge capacity at the 300$^{th}$ cycle to an initial capacity after charge/discharge is performed 300 times at room temperature were measured and are shown in Table 5 below.

TABLE 5

| Type | Resistance at room temperature (25° C.) (mohm) | Voltage drop at high temperature (60° C.) (V) | 300$^{th}$ cycle capacity retention rate at room temperature (25° C.) (%) |
|---|---|---|---|
| Example 2-1 | 1.21 | 0.028 | 98.1 |
| Example 2-2 | 1.14 | 0.021 | 97.4 |
| Example 2-3 | 1.24 | 0.033 | 98.3 |
| Comparative Example 2-1 | 1.42 | 0.038 | 96.4 |

TABLE 5-continued

| Type | Resistance at room temperature (25° C.) (mohm) | Voltage drop at high temperature (60° C.) (V) | 300$^{th}$ cycle capacity retention rate at room temperature (25° C.) (%) |
|---|---|---|---|
| Comparative Example 2-2 | 1.38 | 0.039 | 94.8 |
| Comparative Example 2-3 | 1.65 | 0.051 | 92.6 |
| Comparative Example 2-4 | 1.53 | 0.045 | 94.3 |

The lithium secondary batteries (Examples 2-1 to 2-3) respectively including the positive electrode active materials fabricated in Examples 1-1 to 1-3 exhibited battery resistance significantly reduced at room temperature and an excellent lifespan characteristic in comparison to the lithium secondary batteries (Comparative Examples 2-1 to 2-4) respectively including the positive electrode active materials fabricated in Comparative Examples 1-1 to 1-4. For an output characteristic at high temperature, the lithium secondary batteries (Examples 2-1 to 2-3) respectively including the positive electrode active materials fabricated in Examples 1-1 to 1-3 also exhibited considerably reduced voltage drop in comparison to Comparative Example 2-1 to Comparative Example 2-4, and it can be recognized that the lithium secondary batteries (Examples 2-1 to 2-3) respectively including the positive electrode active materials fabricated in Examples 1-1 to 1-3 have a superior output characteristic.

The invention claimed is:

1. A positive electrode active material for a secondary battery comprising:
   a lithium composite metal oxide particle represented by Formula 1 below, $$Li_aNi_{1-x-y}Co_xM1_yM2_zM3_wO_2 \quad \text{[Formula 1]}$$

wherein, in the Formula 1,
   M1 is a metal element whose surface energy ($\Delta E_{surf}$) calculated by Equation 1 below is −0.5 eV or higher,
   M2 is a metal element whose surface energy ($\Delta E_{surf}$) calculated by Equation 1 below is −1.5 eV or higher and less than −0.5 eV,
   M3 is a metal element whose surface energy ($\Delta E_{surf}$) calculated by Equation 1 below is less than −1.5 eV, and 1.0≤a≤1.5, 0<x≤0.5, 0<y≤0.5, 0.002≤w≤0.1, 0<z≤0.05, 0<x+y≤0.7, $$\Delta E_{surf} = E_{surf2} - E_{surf1} \quad \text{[Equation 1]}$$
$$= (E_{slab2} - E_{bulk}) - (E_{slab1} - E_{bulk})$$

wherein, in the Equation 1

$E_{surf2}$ represents an extent to which a metal element is oriented toward the outermost surface of the lithium composite metal oxide particle, $E_{surf1}$ represents an extent to which the metal element is oriented toward a central portion of the lithium composite metal oxide particle, $E_{slab1}$ is energy of a slab model of the lithium composite metal oxide particle when the metal element is at the central portion of the lithium composite metal oxide particle, $E_{slab2}$ is energy of a slab model of the lithium composite metal oxide when the metal element is at the outermost surface of the lithium composite metal oxide, and $E_{bulk}$ is energy of a bulk model corresponding to each of the slab models.

2. The positive electrode active material of claim 1, wherein:

the M1 is distributed such that an average slope of a concentration profile from a surface of the lithium composite metal oxide particle to a central portion section thereof is 0 or positive (+); and the M2 and M3 are independently distributed such that an average slope of a concentration profile from a surface of the lithium composite metal oxide particle to a central portion section thereof is negative (−).

3. The positive electrode active material of claim 1, wherein the M1 includes any one or two or more selected from the group consisting of Al, Mg, Y, Zn, In, and Mn.

4. The positive electrode active material of claim 1, wherein the M2 includes any one or two or more selected from the group consisting of Zr, Ti, Ta, Hf, Sn, Cr, Sb, Ru, Gd, and Os.

5. The positive electrode active material of claim 1, wherein the M3 includes any one or two or more selected from the group consisting of W, V, Nb, Nd, and Mo.

6. The positive electrode active material of claim 1, wherein:

the lithium composite metal oxide particle has a core-shell structure including a core and a shell located on a surface of the core;

the M1 is included such that an average slope of a concentration profile from a surface of the lithium composite metal oxide particle to a central portion section thereof is 0;

the M2 is included at a concentration of 1 to 25 mol % in the core and at a concentration of 75 to 99 mol % in the shell; and the M3 is included at a concentration of 1 to 10 mol % in the core and at a concentration of 90 to 99 mol % in the shell.

7. The positive electrode active material of claim 6, wherein the core and the shell are included in a volume ratio of 50:50 to 80:20.

8. The positive electrode active material of claim 1, wherein at least one metal element of nickel and cobalt in Formula 1 exhibits a concentration gradient that changes in the lithium composite metal oxide particle.

9. The positive electrode active material of claim 1, wherein:

in the Formula 1, nickel and cobalt independently exhibit a concentration gradient that changes throughout the lithium composite metal oxide particle;

the concentration of nickel decreases with a concentration gradient in a direction from a center of the lithium composite metal oxide particle to a surface thereof; and the concentration of cobalt increases with a concentration gradient in the direction from the center of the lithium composite metal oxide particle to the surface thereof.

10. The positive electrode active material of claim 1, the positive electrode active material further comprises, on a surface of the positive electrode active material particle, at least one metal element selected from the group consisting of the M2 and M3; or a coating layer including a lithium oxide including the at least one metal element.

11. The positive electrode active material of claim 1, wherein the positive electrode active material has an average particle size ($D_{50}$) of 4 μm to 20 μm.

12. The positive electrode active material of claim 1, wherein the positive electrode active material has a Brunauer-Emmett-Teller (BET) specific surface area of 0.3 m²/g to 1.9 m²/g.

13. The positive electrode active material of claim 1, wherein the positive electrode active material has a tap density of 1.7 g/cc to 2.8 g/cc.

14. A positive electrode for a secondary battery comprising the positive electrode active material of claim 1.

15. A lithium secondary battery comprising the positive electrode of claim 14.

* * * * *